United States Patent
Mansour et al.

(10) Patent No.: US 8,036,136 B1
(45) Date of Patent: Oct. 11, 2011

(54) SYSTEM AND METHOD OF ALLOCATING SUB-CHANNELS

(75) Inventors: Nagi A. Mansour, Arlington, VA (US); Habib Riazi, Stafford, VA (US)

(73) Assignee: Clear Wireless LLC, Kirkland, WA (US)

( * ) Notice: Subject to any disclaimer, the term of this patent is extended or adjusted under 35 U.S.C. 154(b) by 831 days.

(21) Appl. No.: 12/046,554

(22) Filed: Mar. 12, 2008

(51) Int. Cl.
- *G01R 31/08* (2006.01)
- *H04W 4/00* (2009.01)
- *H04L 12/28* (2006.01)
- *H04J 3/16* (2006.01)

(52) U.S. Cl. .......... 370/252; 370/329; 370/431; 370/468

(58) Field of Classification Search .................. None
See application file for complete search history.

(56) References Cited

U.S. PATENT DOCUMENTS

| | | | |
|---|---|---|---|
| 7,046,678 B2 | 5/2006 | Jiang et al. | |
| 7,079,845 B2 | 7/2006 | Shively et al. | |
| 7,209,460 B2 | 4/2007 | Fitzek et al. | |
| 2005/0041618 A1* | 2/2005 | Wei et al. | 370/328 |
| 2006/0252389 A1* | 11/2006 | Yellin et al. | 455/115.3 |
| 2008/0310301 A1* | 12/2008 | Wade et al. | 370/230 |

* cited by examiner

*Primary Examiner* — Nittaya Juntima
(74) *Attorney, Agent, or Firm* — Crowell & Moring LLP

(57) ABSTRACT

Systems and methods of allocating sub-channels are provided. A method a signal quality measure associated with a first mobile station is determined. It is also determined that the first mobile station has an associated Quality of Service (QoS) above a predetermined QoS. A number of sub-channels are allocated to the first mobile station based on the signal quality measure and QoS associated with the first mobile station, where more sub-channels are allocated for lower signal quality measures compared to higher signal quality measures.

20 Claims, 5 Drawing Sheets

| CINR=A | |
|---|---|
| Data Rate | Sub-Channels |
| $X_{A1}$ | $Y_{A1}$ |
| • | • |
| • | • |
| $X_{An}$ | $Y_{An}$ |

· · ·

| CINR=N | |
|---|---|
| Data Rate | Sub-Channels |
| $X_{N1}$ | $Y_{N1}$ |
| • | • |
| • | • |
| $X_{Nn}$ | $Y_{Nn}$ |

FIGURE 4

SYSTEM AND METHOD OF ALLOCATING SUB-CHANNELS

BACKGROUND OF THE INVENTION

In wireless communication systems radio frequency resources are allocated for communication between base stations and mobile stations. Due to a number of factors, such as governmental allocation of frequencies, interference and the like, there are a limited number of radio frequency resources to allocate for wireless communications. Thus, allocation of radio frequency resources requires careful consideration of a large number of factors, and any particular allocation technique will have drawbacks with regard to other allocation techniques.

FIG. 1 illustrates a conventional wireless communication system implementing one resource allocation technique. This system includes a base station 105 and two mobile stations 110 and 115. This resource allocation technique allocates sub-channels on the basis of signal quality measurements, such as carrier-to-interference noise ratio (CINR), where more sub-channels are allocated to mobile stations that have better signal quality conditions than mobile stations with worse conditions. This typically results in mobile stations that are located closer to base station 105 being allocated more sub-channels than mobile stations located further away from the base station. In this technique the base station includes a scheduler to allocate the sub-channels, and this allocation technique is referred to as proportional fair scheduling.

SUMMARY OF THE INVENTION

Systems and methods of allocating sub-channels are provided. An exemplary method involves determining a signal quality measure associated with a first mobile station and determining that the first mobile station has an associated Quality of Service (QoS) above a predetermined QoS. A number of sub-channels are allocated to the first mobile station based on the signal quality measure and QoS associated with the first mobile station, wherein more sub-channels are allocated for lower signal quality measures compared to higher signal quality measures.

Other objects, advantages and novel features of the present invention will become apparent from the following detailed description of the invention when considered in conjunction with the accompanying drawings.

BRIEF DESCRIPTION OF THE DRAWING FIGURES

FIG. 4 is a block diagram of exemplary sub-channel allocation tables in accordance with the present invention.

DETAILED DESCRIPTION OF THE PREFERRED EMBODIMENTS

Figure 1:
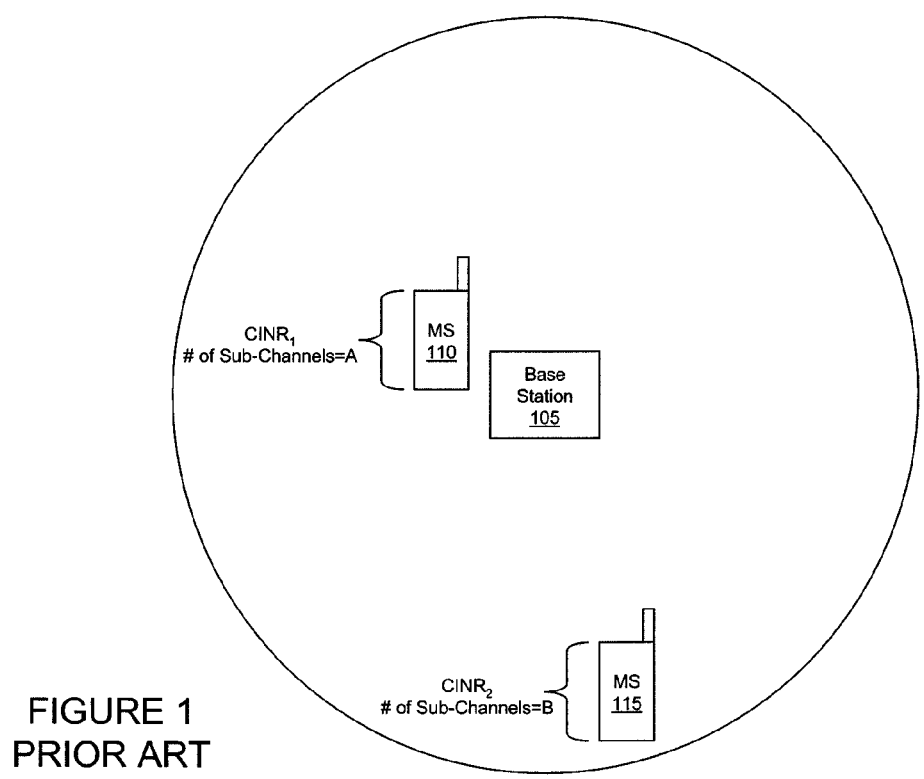
FIG. 1 is a block diagram of a conventional wireless communication system.
Figure 2:
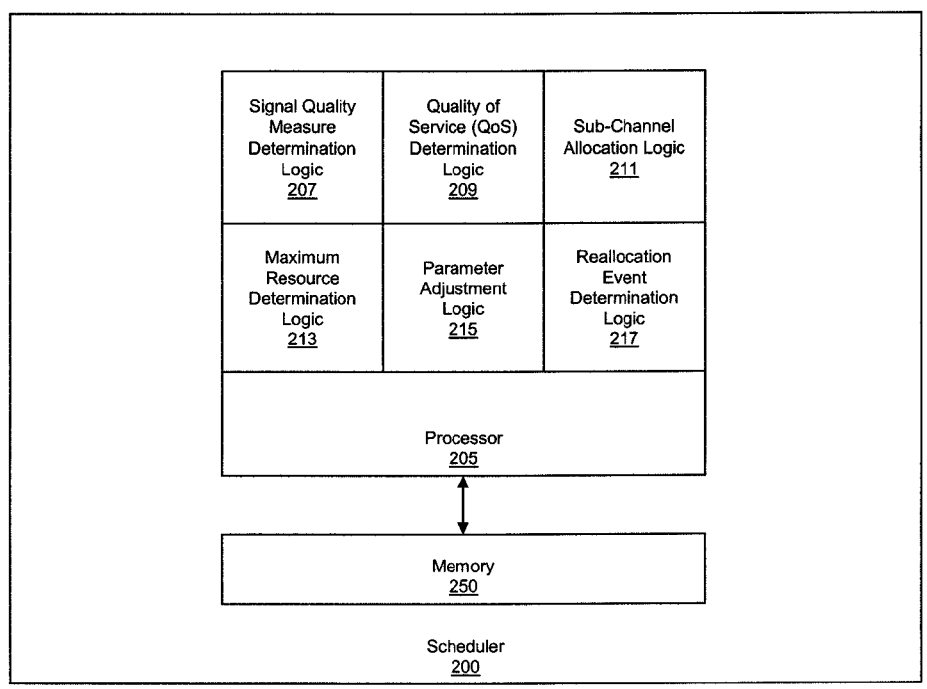
FIG. 2 is a block diagram of an exemplary scheduler in accordance with the present invention.

FIG. 2 is a block diagram of an exemplary scheduler in accordance with the present invention. Scheduler 200 includes processor 205 and memory 250. Processor 205 includes logic 207-217, which will be described in more detail below in connection with FIGS. 3A and 3B. Processor 205 can be any type of processor, such as a microprocessor, field programmable gate array (FPGA) and/or an application specific integrated circuit (ASIC). When processor 205 is a microprocessor then logic 207-217 can be processor-executable code loaded from memory 250.

Scheduler 200 can be a component of a base station, or can be coupled to the base station. Furthermore, processor 205 can be part of a base station processor and/or memory 250 can be part of the base station memory.

Figure 3A:
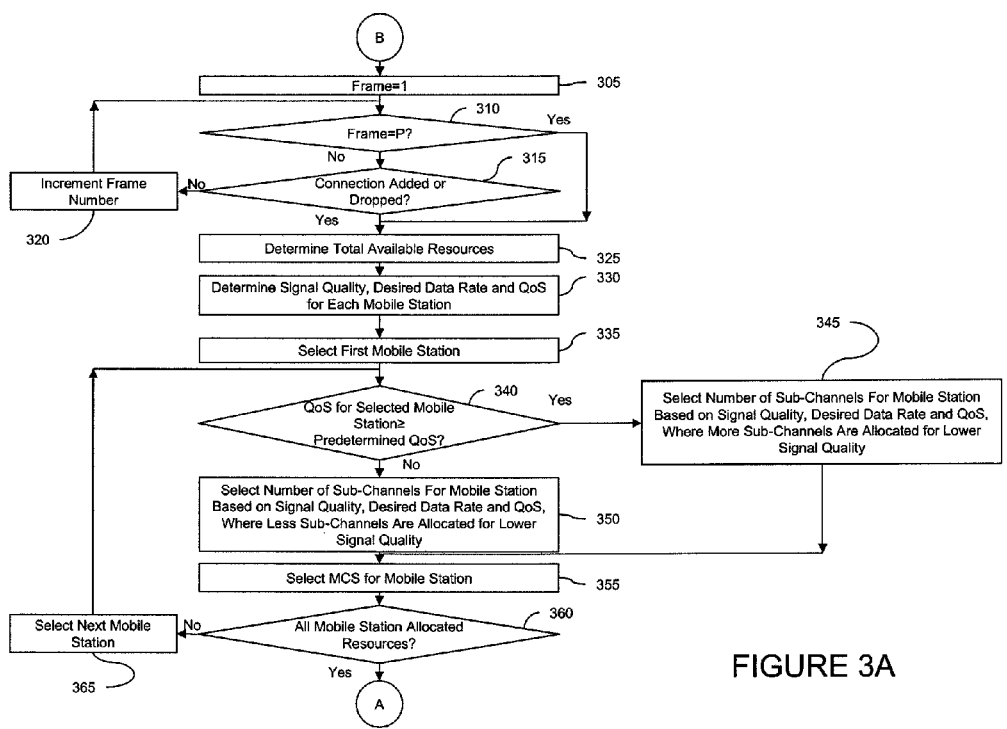
FIGS. 3A and 3B are flow diagrams of an exemplary method in accordance with the present invention.
Figure 3B:
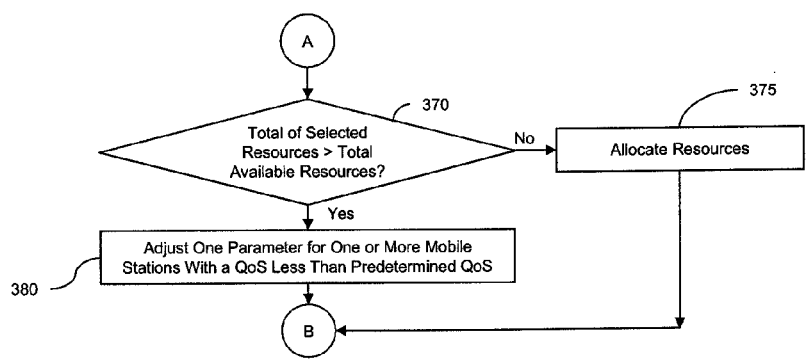

FIGS. 3A and 3B are flow diagrams of an exemplary method in accordance with the present invention. The method of the present invention can reallocate radio resources after a predetermined number of frames and/or whenever a connection is added or dropped with the base station. Accordingly, logic 217 of scheduler 200 initiates a frame counter to 1 (step 305) and determines whether a predetermined number of frames P has occurred (step 310). When a predetermined number of frames P has not occurred ("No" path out of decision step 310), then logic 217 determines whether a connection has been added or dropped (step 315). When a connection has not been added or dropped ("No" path out of decision step 315), then logic 217 increments the frame number counter by 1 (step 320) and again determines whether a predetermined number of frames P has occurred (step 310).

When a predetermined number of frames P has occurred ("Yes" path out of decision step 310) or when a connection has been added or dropped ("Yes" path out of decision step 315), then logic 213 determines the total amount of available resources for allocation by the base station (step 325). Logic 207 determines the signal quality, desired data rate and Quality of Service (QoS) for each mobile station supported by the base station (step 330).

Scheduler 200 selects a first mobile station (step 335) and logic 209 determines whether the QoS for the selected mobile station is greater than or equal to a predetermined QoS (step 340). In accordance with exemplary embodiments of the present invention, sub-channel allocation is performed while accounting for a QoS for each mobile station. The QoS for a particular mobile station can be based upon, for example, the type of subscription that the user of the mobile station has with the wireless network operator of the base station. For example, users can pay more for a subscription with greater QoS.

When the selected mobile station has a QoS that is greater than or equal to a predetermined QoS ("Yes" path out of decision step 340), then logic 211 selects a number of sub-channels for the mobile station based on a signal quality, desired data rate and the QoS, where more sub-channels are allocated for lower signal quality measures compared to higher signal quality measures (step 345). It should be recognized that allocating more sub-channels to mobile stations with lower signal quality measures can provide a throughput similar to mobile stations with better signal quality measures.

FIG. 4 is a block diagram of exemplary sub-channel allocation tables in accordance with the present invention. Accordingly, based on the signal quality measure (e.g., CINR) for the mobile station, logic 211 selects one of the tables, and then based on the desired data rate, the selected table indicates the number of sub-channels for allocation. The present invention can be implemented such that there is one set of tables for all QoS's greater than or equal to the predetermined QoS, or there can be separate sets of tables for each particular QoS.

Returning now to FIGS. 3A and 3B, if the QoS for the mobile station is less than the predetermined QoS ("No" path out of decision step 340), then logic 211 selects a number of sub-channels for the mobile station based on a signal quality, desired data rate and the QoS, where less sub-channels are allocated for lower signal quality measures compared to higher signal quality measures (step 350). After the number of sub-channels has been selected for the mobile station (step 345 or 350), then scheduler 200 selects a modulation and coding scheme (MCS) for the mobile station (step 355). Scheduler 200 then determines whether all mobile stations have been allocated resources (step 360). When not all mobile stations have been allocated resources ("No" path out of decision step 360), then scheduler 200 selects the next mobile station (step 365) and allocates resources for the next mobile station (steps 340-355).

When all of the mobile stations have been allocated resources ("Yes" path out of decision step 360), then logic 213 determines whether the total of the selected resources is greater than the total available resources (step 370). When the total of the selected resources is not greater than the total available resources ("No" path out of decision step 370), then the base station performs the actual resource allocation by informing the mobile stations of the allocated resources (step 375). If the total of the selected resources is greater than the total available resources ("Yes" path out of decision step 370), then logic 215 adjusts one parameter (e.g., desired data rate, MCS, QoS, etc.) for one of the mobile stations with a QoS less than the predetermined QoS in order to bring the total of the selected resources to less than or equal to the total available resources (step 380). It will be recognized that a parameter can be adjusted for more than one mobile station, and more than one parameter can be adjusted for each mobile station. Moreover, one or more parameters can be adjusted for mobile stations with QoS that are equal to or above the predetermined QoS.

The present invention can be employed in connection with any type of wireless communication protocol, such as CDMA (and all variants thereof), GSM, WiFi, WiMAX and/or the like. When, for example, WiMAX protocol is employed, the sub-channels can be in a WiMAX radio frame.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of allocating sub-channels, comprising the acts of:
   determining a signal quality measure associated with each of a plurality of mobile stations;
   identifying mobile stations of the plurality of mobile stations with an associated Quality of Service (QoS) above or equal to a predetermined QoS and mobile stations of the plurality of mobile stations having an associated QoS below the predetermined QoS;
   allocating sub-channels to each of the plurality of mobile stations based on the respective signal quality measure of each of the plurality of mobile stations and the respective associated QoS of each of the plurality of mobile stations,
   wherein for mobile stations with the associated QoS above or equal to the predetermined QoS, more sub-channels are allocated to mobile stations with lower signal quality measures compared to mobile stations with higher signal quality measures, and
   wherein for mobile stations with the associated QoS below the predetermined QoS, less sub-channels are allocated to mobile stations with lower signal quality measures compared to mobile stations with higher signal quality measures.

2. The method of claim 1, wherein the associated QoS for each of the plurality of mobile stations is based on a type of subscription that a respective user of each of the plurality of mobile stations has with a wireless network operator.

3. The method of claim 2, further comprising the acts of:
   determining whether the sub-channels allocated to the plurality of mobile stations exceeds an available number of sub-channels.

4. The method of claim 3, wherein when the sub-channels allocated to the plurality of mobile stations exceeds the available number of sub-channels, sub-channels are reallocated to one of the plurality of mobile stations.

5. The method of claim 4, wherein a parameter associated with one of the plurality of mobile stations is adjusted prior to reallocation of sub-channels.

6. The method of claim 5, wherein the parameter is a data rate or modulation and coding scheme (MCS).

7. The method of claim 2, wherein the act of allocating the number of sub-channels occurs when a connection is added or dropped by a base station supporting the plurality of mobile stations.

8. The method of claim 2, wherein the act of allocating the number of sub-channels occurs when a predetermined amount of time occurs, the predetermined amount of time corresponding to a number of radio frames.

9. The method of claim 2, wherein the act of allocating the number of sub-channels comprises the act of:
   identifying a number of sub-channels corresponding to the signal quality measure, the QoS and a desired data rate.

10. The method of claim 2, wherein the sub-channels are in a WiMAX frame.

11. A wireless network device, comprising:
    signal quality measure determination logic that determines a signal quality measure associated with each of a plurality of mobile stations;
    Quality of Service (QoS) determination logic that identifies mobile stations of the plurality of mobile stations with an associated QoS that is above or equal to a predetermined QoS and mobile stations of the plurality of mobile stations having an associated QoS below the predetermined QoS;
    sub-channel allocation logic that allocates sub-channels to each of the plurality of mobile stations based on the respective signal quality measure of each of the plurality of mobile stations and the respective associated QoS of each of the plurality of mobile stations,
    wherein for mobile stations with the associated QoS above or equal to the predetermined QoS, more sub-channels are allocated to mobile stations with lower signal quality measures compared to mobile stations with higher signal quality measures,
    wherein for mobile stations with the associated QoS below the predetermined QoS, less sub-channels are allocated to mobile stations with lower signal quality measures compared to mobile stations with higher signal quality measures, and
    wherein the wireless network device further comprises a processor for executing the signal quality measure determination logic, QoS determination logic, and sub-channel allocation logic.

12. The wireless network device of claim 11, wherein the associated QoS for each of the plurality of mobile stations is based on a type of subscription that a respective user of each of the plurality of mobile stations has with a wireless network operator.

13. The wireless network device of claim 12, further comprising:
  maximum resource determination logic that determines whether the sub-channels allocated to the plurality of mobile stations exceeds an available number of sub-channels.

14. The wireless network device of claim 13, wherein when the sub-channels allocated to the plurality of mobile stations exceeds the available number of sub-channels, the sub-channel allocation logic reallocates sub-channels to one of the plurality of mobile stations.

15. The wireless network device of claim 14, further comprising:
  parameter adjustment logic that adjusts a parameter associated with one of the plurality of mobile stations prior to reallocation of sub-channels.

16. The wireless network device of claim 15, wherein the parameter is a data rate or modulation and coding scheme (MCS).

17. The wireless network device of claim 12, further comprising:
  reallocation event determination logic that determines when a connection is added or dropped by a base station supporting the plurality of mobile stations, and informs the sub-channel allocation logic of the occurrence of the adding or dropping of a connection by the base station.

18. The wireless network device of claim 12, further comprising:
  reallocation event determination logic that determines when a predetermined amount of time occurs, the predetermined amount of time corresponding to a number of radio frames and informs the sub-channel allocation logic of the occurrence of the occurrence of the predetermined amount of time.

19. The wireless network device of claim 12, wherein the sub-channel allocation logic identifies a number of sub-channels corresponding to the signal quality measure, the QoS and a desired data rate.

20. The wireless network device of claim 12, wherein the sub-channels are in a WiMAX frame.

\* \* \* \* \*